United States Patent [19]
Heveron et al.

[11] Patent Number: 5,132,862
[45] Date of Patent: Jul. 21, 1992

[54] ERASURE PREVENTING BUTTON WITH A PLANAR SURFACE TO CONTROL INADVERTENT SLIDING FOR TAPE CASSETTES

[75] Inventors: John A. Heveron, Champlin; Vincent P. Teuber, Hastings, both of Minn.

[73] Assignee: Minnesota Mining and Manufacturing Company, St. Paul, Minn.

[21] Appl. No.: 620,757

[22] Filed: Dec. 3, 1990

[51] Int. Cl.$^5$ .................................. G11B 23/02
[52] U.S. Cl. ....................... 360/132; 360/60; 242/198
[58] Field of Search ............ 360/60, 132, 137; 242/198-199

[56] References Cited

U.S. PATENT DOCUMENTS

| | | | |
|---|---|---|---|
| 4,399,481 | 8/1983 | Loranger et al. | 360/132 |
| 4,513,330 | 4/1985 | Nakao | 360/60 |
| 4,577,242 | 3/1986 | Tetsuka | 360/60 |
| 4,602,300 | 7/1986 | Ogata et al. | 360/60 |
| 4,607,299 | 8/1986 | Oishi et al. | 360/60 |
| 4,630,141 | 12/1986 | Schulze | 360/60 |
| 4,679,109 | 7/1987 | Okamura et al. | 360/132 |
| 4,723,179 | 2/1988 | Posso | 360/132 |
| 4,734,812 | 3/1988 | Tanaka et al. | 360/60 |
| 4,744,530 | 5/1988 | Cybulski et al. | 360/132 |
| 4,769,731 | 9/1988 | Schoettle et al. | 360/60 |
| 4,769,732 | 9/1988 | Tanaka | 360/132 |
| 4,791,504 | 12/1988 | Igarashi et al. | 360/60 |
| 4,796,138 | 1/1989 | Ono | 360/60 |
| 4,844,378 | 7/1989 | Oishi | 242/199 |
| 4,908,725 | 3/1990 | Iwahashi | 360/132 |

*Primary Examiner*—Aristotelis Psitos
*Assistant Examiner*—Alfonso Garcia
*Attorney, Agent, or Firm*—Gary L. Griswold; Walter N. Kirn; Charles D. Levine

[57] ABSTRACT

An erasure preventing button for preventing recording on a magnetic tape cassette slides within a cavity in a side wall of the cassette between a released position and a depressed position. The erasure preventing button includes a base, which interacts with the tape recorder when the button is released, and a front wall. The front wall includes an arm with a shoulder which is biased toward an opening formed in the side wall of the cavity. The shoulder extends into the opening when the erasure preventing button is released and includes a planar inclined surface which frictionally engages one corner of the opening to prevent the button from sliding from the released position to the depressed position. A rear arm extending from the base prevents the erasure preventing button from being removed from the cavity.

11 Claims, 2 Drawing Sheets

ERASURE PREVENTING BUTTON WITH A PLANAR SURFACE TO CONTROL INADVERTENT SLIDING FOR TAPE CASSETTES

TECHNICAL FIELD

The present invention relates to devices for preventing recording on tape cassettes. More particularly, the present invention relates to slidable erasure preventing buttons which prevent recording on video cassettes.

BACKGROUND OF THE INVENTION

All conventional audio and video tape cassettes have some form of erasure preventing mechanism to prevent previously recorded signals from being inadvertently erased. These mechanisms, also called recording lock out mechanisms, in their simplest form include a recess or cavity formed in the side wall of the cassette and a tab formed in the side wall and located to cover the cavity. When the tab covers the cavity, a detecting member of the cassette recorder permits recording on the tape. When the tab is removed, the detecting member prevents recording. After removal of the tab, in order to rerecord on the tape cassette, the recess must be covered using, for example, adhesive tape. However, this is cumbersome for the user.

U.S. Pat. No. 4,607,299 to Oishi et al., discloses a box-shaped member which slides within a space in the side wall of the cassette between first and second positions in which recording is prevented and permitted, respectively. The member includes side walls which are biased toward and frictionally engage the walls of the space to maintain the member in either the recording preventing or recording permitting position. However, other than this frictional engagement, there is no mechanism to prevent inadvertent sliding of the member between the two positions.

Another configuration for an erasure preventing button slidable within a cavity in the cassette side wall is shown in FIG. 1. As shown, the tape cassette 10 includes top, bottom, and side walls 12, 14, 16. A cavity 18 is formed in the side wall 16 and an opening 20 is formed in the side wall 16 adjacent the cavity 18. The erasure preventing button 30 is slidable within the cavity 18 between a released position and a depressed position. In the released position, recording is permitted and the button 30 engages the opening. In the depressed position, recording is prevented.

The erasure preventing button 30 of FIG. 1 includes a rectangular base 32 having a tab 34 to facilitate sliding the button 30 between the depressed and released positions. A rear arm 36 extends from the base 32 and prevents the erasure preventing button 30 from being removed from the cavity 18. The rear arm 36 culminates in a shoulder 38 which engages the end of a rear wall 22 of the cavity 18 to prevent the erasure preventing button 30 from being removed from the cavity. A rectangular front wall 40 perpendicular to the base 32 includes an arm 42 which is biased toward the opening 20. A shoulder 44 is formed on the arm 42 and extends into the opening 20 when the erasure preventing button 30 is in the released position. The surface 46 of the shoulder 44 facing away from the base 32 includes a curved convex surface 48 which frictionally engages one corner 24 of the opening 20 to resist sliding of the button 30 from the released position to the depressed position. However, the curved shape provides a wide range of varying resistance to sliding.

SUMMARY OF THE INVENTION

The present invention improves upon known erasure preventing buttons and specifically is directed to a novel configuration for an erasure preventing button which more precisely resists inadvertent sliding between recording preventing and recording permitting positions. The magnetic tape cassette for use with this erasure preventing button includes top and bottom walls and a side wall connecting the top and bottom walls. A cavity is formed in the side wall and an opening is formed in the side wall into the cavity. The opening has at least one perpendicular corner. The erasure preventing button is slidable within the cavity between a released position and a depressed position. In the released position, recording is permitted and the button engages the opening. In the depressed position, recording is prevented.

The erasure preventing button includes a base having a tab extending substantially in the plane of the base to facilitate sliding the button between the depressed and released positions. A rear arm extends from the base and prevents the erasure preventing button from being removed from the cavity. The rear arm culminates in a shoulder which engages the end of one of the walls of the cavity.

A front wall extends from the base and the front wall and/or the base interacts with the tape recorder when the erasure preventing button is in the released position. An arm is formed as part of the front wall and is biased toward the opening. A shoulder is formed on the arm and extends into the opening when the erasure preventing button is in the released position. The surface of the shoulder facing away from the base includes a planar inclined surface which frictionally engages the perpendicular corner of the opening. This prevents inadvertent sliding of the button from the released position to the depressed position. The inclined surface of the shoulder is inclined from the plane perpendicular to the direction of button sliding between 5° and 15°, and preferably 11°.

DETAILED DESCRIPTION OF PREFERRED EMBODIMENTS

Figure 2:
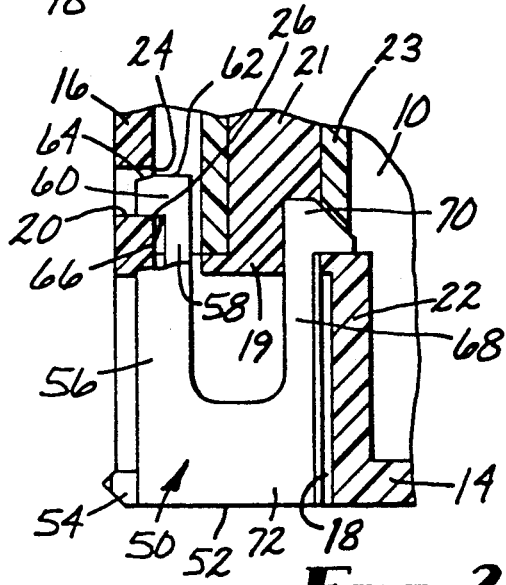
FIG. 2 is a cross-sectional view of an erasure preventing button according to the present invention mounted in the released position in a cassette.
Figure 5:
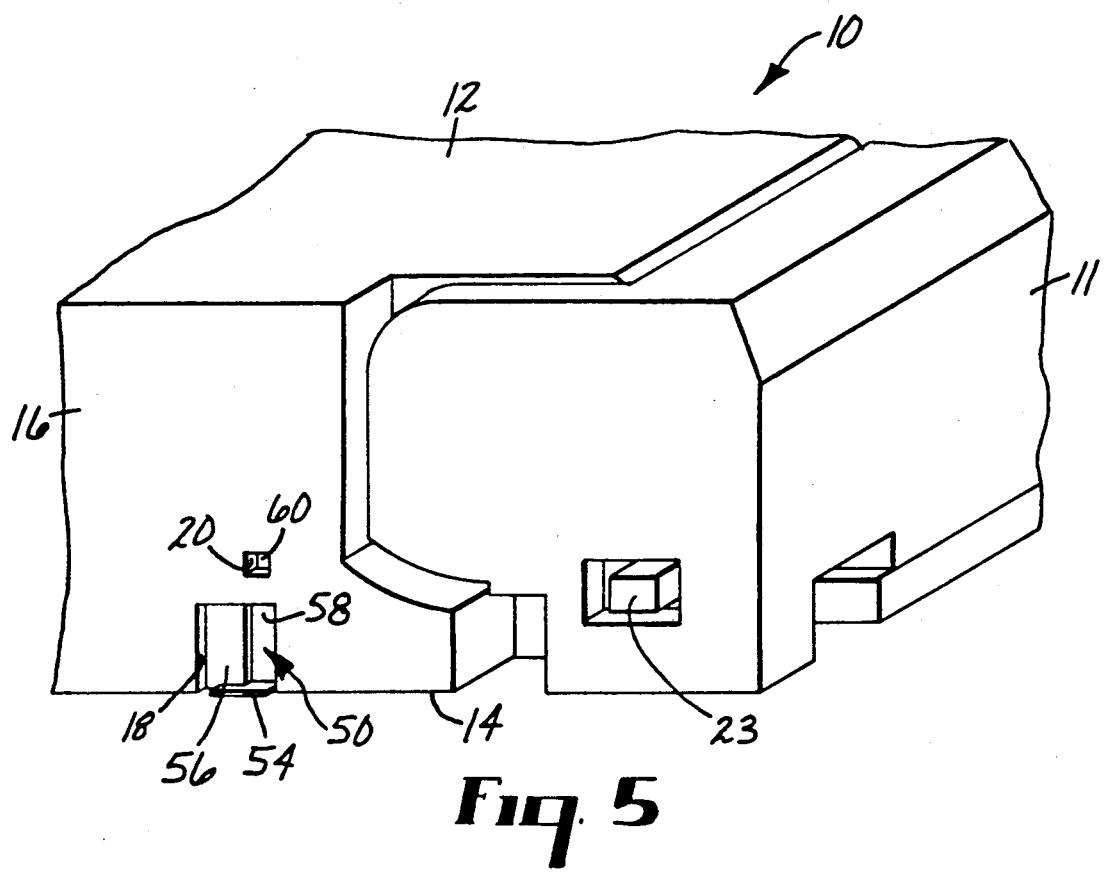
FIG. 5 is a partial perspective view of the cassette with the erasure preventing button of FIG. 2.

The present invention is directed to a novel configuration for an erasure preventing button which restricts recording on a magnetic tape cassette in a tape recorder. The magnetic tape cassette 10 for use with this erasure preventing button includes top and bottom walls 12, 14 and a side wall 16 connecting the top and bottom walls 12, 14, as best shown in FIG. 5. A cavity 18 is formed in the side wall 16 and is designed so that it is open on both the side wall 16 and bottom wall 14 sides. In the illustrated embodiments, the cavity 18 is open on its entire bottom wall 14 side and for a majority of its side wall 16 side. An opening 20 is formed in the side wall 16 into the cavity 18 adjacent the open portion of the cavity 18. The opening 20 has at least one perpendicular corner 24 formed on the side wall 16. Additionally, as best shown in FIG. 2, the cavity 18 includes a wall portion 19, on which a post 21 is formed. The post 21 receives a pivotable door lock device 23 which holds the cassette door 11 closed until the cassette 10 is inserted into the tape recorder.

Figure 1:
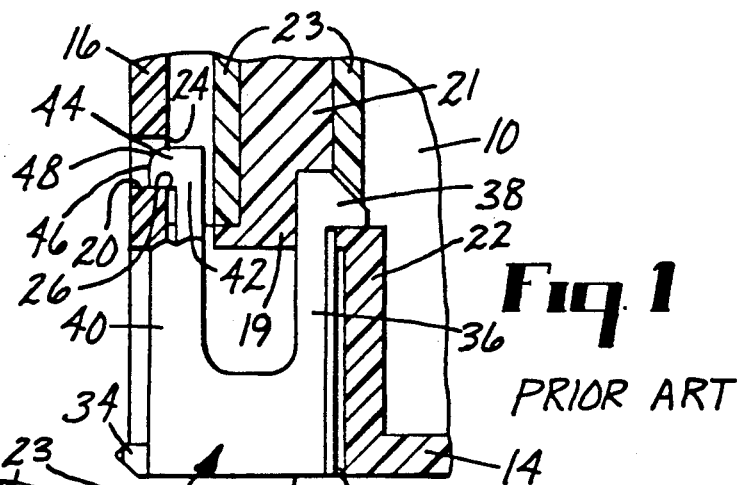
FIG. 1 is a cross-sectional view of a prior art erasure preventing button mounted in a cassette.
Figure 3:
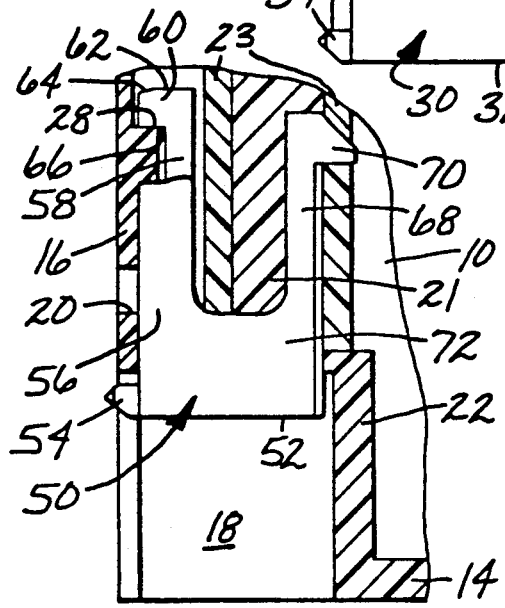
FIG. 3 is a cross-sectional view of the erasure preventing button of FIG. 2 mounted in the depressed position in the cassette.

The erasure preventing button 50, shown in FIGS. 2-5, prevents recording on the magnetic tape and is slidable within the cavity 18 between a released position (FIG. 2) and a depressed position (FIG. 3). In the released position, recording is permitted and the button 50 engages the opening 20. In the depressed position, recording is prevented. Although the erasure preventing button 50 is designed to be used with any type of video or audio cassette, it is envisioned that it will be used particularly in Betacam SP and Betacam PB Oxide small and large cassettes, which currently use erasure preventing buttons 30 as illustrated in FIG. 1.

The erasure preventing button 50 includes a main body portion which is made of a base 52 having a tab 54, and a front wall 56. The tab 54 extends substantially in the plane of the base 52, but not for the entire length of the base 52, to facilitate sliding the button 50 between the depressed and released positions. The front wall 56 extends perpendicularly from the base 52. The front wall 56 and/or the base 52 interacts with the tape recorder to permit recording when the erasure preventing button 50 is in the released position. An arm 58 is formed as part of the front wall 56 and is biased toward the opening 20. A shoulder 60 is formed on the arm 58 and extends into the opening 20 in the side wall 16 when the erasure preventing button 50 is in the released position.

The upper surface 62 of the shoulder 60, facing away from the base 52, includes a planar beveled or inclined surface 64 which frictionally engages the perpendicular corner 24 of the opening 20. This prevents inadvertent sliding of the button 50 from the released position to the depressed position. The inclined surface 64 of the shoulder 60 is inclined from the plane perpendicular to the direction of button sliding between 5° and 15°, and preferably 11°, as best shown in FIGS. 2 and 3. These angles have been found to be best when the walls 12, 14, 16 of the cassette 10 are made of ABS and the erasure preventing button 50 is made of acetal. The preferred angle can vary with other materials depending on their lubriciousness. Additionally, the erasure preventing button 50 provides a greater tolerance for dimensional fit by maintaining a constant angle of inclined surface which engages the perpendicular corner 24. Alternatively, the corner 24 could be inclined while the lower surface 66 is horizontal.

The lower surface 66 of the shoulder 60, facing toward the base 52, engages the lower corner 26 of the opening to prevent the button 50 from being removed from the cavity 18. Additionally, the lower surface 66 of the front wall shoulder 60 could also be a planar inclined surface to provide a controlled resistance between the shoulder 60 and the corner 28 of the cassette side wall 16. Alternatively, the corner 28 could be inclined while the lower surface 66 is horizontal. This configuration would be used in situations where the cassette 10 is to record, erase, and rerecord many times.

Figure 4:
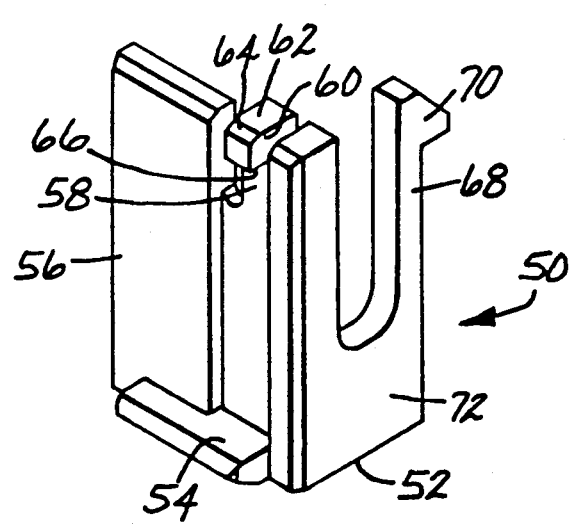
FIG. 4 is a perspective view of the erasure preventing button of FIG. 2.

A rear arm 68 extends perpendicularly from the base 52 and is biased away from the front wall arm 58. To simplify forming the erasure preventing button 50, the rear arm 68 is formed as part of a side wall 72 which extends as one piece from the front wall 56, as best shown in FIG. 4. The rear arm 68 culminates in a shoulder 70 which is biased toward and engages the end of the rear wall 22 of the cavity 18 to prevent the erasure preventing button 50 from being removed. This shoulder 70 is necessary when the cavity 18 is designed so that it is open on both the side wall 16 and bottom wall 14 sides, as shown in FIGS. 2, 3, and 5, to simplify molding of the cassette 10.

The erasure preventing button 50 provides a controlled resistance to position changes. This resistance is controlled to desired levels (e.g., 600 gm/min) more precisely than the prior art button shown in FIG. 1. Additionally, the erasure preventing button 50 provides more stable levels of resistance through repeated usage. When using the erasure preventing button 50, resistance to movement between the released and depressed positions after four such movements is expected to be 60% to 80% as high as the resistance during the first movement. In contrast, with the prior art button illustrated in FIG. 1, the resistance after the fourth movement between the released and depressed positions is as low as 15% to 50% as high as the initial movement resistance.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. An erasure preventing button for preventing recording on a magnetic tape cassette in a tape recorder, the cassette having top and bottom walls and a side wall connecting the top and bottom walls, a cavity formed in the side wall and open on a portion of its side wall side, an opening formed in the side wall into the cavity adjacent the open portion of the cavity, and at least one interior corner formed on the side wall, wherein the erasure preventing button is slidable within the cavity between a released position in which recording is permitted, and the erasure preventing button engages the opening and interacts with the tape recorder, and a depressed position in which recording is prevented, wherein the erasure preventing button comprises:

a main body portion engageable by a user to slide between the released position and the depressed position;

a front arm connected to the main body portion and biased toward the opening, wherein the front arm comprises a shoulder extending into the cassette side wall opening when the erasure preventing button is in the released position, wherein the shoulder includes a planar surface which frictionally engages the surface of the side wall to control inadvertent sliding of the erasure preventing button between the released position and the depressed position; and means for preventing the erasure preventing button from being removed from the cavity.

2. The erasure preventing button of claim 1 wherein the interior corner formed on the side wall is substantially perpendicular and the planar surface formed on the shoulder is an inclined surface.

3. The erasure preventing button of claim 2 wherein the substantially perpendicular interior corner formed on the side wall is formed as part of the opening in the side wall and the planar inclined surface frictionally engages the substantially perpendicular interior corner of the opening to control inadvertent sliding of the erasure preventing button from the released position to the depressed position.

4. The erasure preventing button of claim 3 wherein the inclined surface of the front arm shoulder is inclined from the plane perpendicular to the direction of button sliding between 5° and 15°.

5. The erasure preventing button of claim 4 wherein the inclined surface of the shoulder is inclined 11°.

6. An erasure preventing button for preventing recording on a magnetic tape cassette in a tape recorder, the cassette having top and bottom walls and a side wall connecting the top and bottom walls, a cavity formed in the side wall and open on a portion of its side wall side, and an opening formed in the side wall into the cavity adjacent the open portion of the cavity and having at least one perpendicular corner, wherein the erasure preventing button is slidable within the cavity between a released position in which recording is permitted, and the erasure preventing button engages the opening and interacts with the tape recorder, and a depressed position in which recording is prevented, wherein the erasure preventing button comprises:

a main body portion engageable by a user to slide between the released position and the depressed position, and comprising:
a base having a tab extending substantially in the plane of the base to facilitate sliding the erasure preventing button between the depressed and released positions, wherein the base is generally perpendicular to the cassette side wall when the erasure preventing button is positioned within the cavity; and
a front wall extending generally perpendicularly from the base;
an arm biased toward the opening and comprising a shoulder which extends into the opening when the erasure preventing button is in the released position, wherein the surface of the shoulder away from the base includes a planar inclined surface which is inclined from the plane perpendicular to the direction of button sliding between 5° and 15° and which frictionally engages the perpendicular corner of the opening to control inadvertent sliding of the erasure preventing button from the released position to the depressed position; and
means for preventing the erasure preventing button from being removed from the cavity comprising a rear arm extending from the base, wherein the rear arm comprises a shoulder which engages the end of one of the walls of the cavity.

7. A magnetic tape cassette comprising:
top and bottom walls and a side wall connecting the top and bottom walls and having at least one substantially perpendicular interior corner;
a cavity formed in the side wall and open on a portion of its side wall side;
an opening formed in the side wall into the cavity adjacent the open portion of the cavity; and
an erasure preventing button for preventing recording on the magnetic tape cassette in a tape recorder, wherein the erasure preventing button is slidable within the cavity between a released position in which recording is permitted, and the erasure preventing button engages the opening and interacts with the tape recorder, and a depressed position in which recording is prevented, wherein the erasure preventing button comprises:
a main body portion including a base engageable by a user;
a front arm connected to the main body portion and biased toward the opening, wherein the front arm comprises a shoulder extending into the cassette side wall opening when the erasure preventing button is in the released position, wherein the shoulder includes a planar inclined surface which frictionally engages the substantially perpendicular corner of the side wall to control inadvertent sliding of the erasure preventing button between the released position and the depressed position; and
means for preventing the erasure preventing button from being removed from the cavity.

8. The magnetic tape cassette of claim 7 wherein the preventing means comprises a rear arm extending from the base, wherein the rear arm comprises in a shoulder which engages the end of one of the walls of the cavity.

9. The magnetic tape cassette of claim 7 wherein the inclined surface of the shoulder is inclined from the plane perpendicular to the direction of button sliding between 5° and 15°.

10. The magnetic tape cassette of claim 7 wherein the substantially perpendicular interior corner formed on the side wall is formed as part of the opening in the side wall and the planar inclined surface frictionally engages the substantially perpendicular interior corner of the opening to control inadvertent sliding of the erasure preventing button from the released position to the depressed position; and wherein the main body portion of the erasure preventing button comprises a base and a front wall extending from the base.

11. The magnetic tape cassette of claim 10 further comprising a tab extending from the base substantially in the plane of the base to facilitate sliding the erasure preventing button between the depressed and released positions.

* * * * *